(12) United States Patent
Smith

(10) Patent No.: US 8,040,541 B2
(45) Date of Patent: Oct. 18, 2011

(54) SECURE DOCUMENT PRINTING

(75) Inventor: Wendell M. Smith, Smith's Parish (BM)

(73) Assignee: Polestar, Ltd. (BM)

( * ) Notice: Subject to any disclaimer, the term of this patent is extended or adjusted under 35 U.S.C. 154(b) by 1308 days.

(21) Appl. No.: 10/635,389

(22) Filed: Aug. 6, 2003

(65) Prior Publication Data

US 2004/0080777 A1 Apr. 29, 2004

Related U.S. Application Data

(60) Provisional application No. 60/401,312, filed on Aug. 6, 2002.

(51) Int. Cl.
*G06K 15/00* (2006.01)
*G06K 15/02* (2006.01)
*H04N 1/40* (2006.01)

(52) U.S. Cl. ............ 358/1.14; 358/1.11; 358/1.18; 358/3.28; 382/100; 380/231

(58) Field of Classification Search .......... 380/231, 380/51, 54, 210, 252, 287; 382/100, 232, 382/240; 358/3.28, 1.11–1.18; 235/487, 235/382; 705/50; 726/2; 713/176, 179; 370/522–529; 283/72, 74–81
See application file for complete search history.

(56) References Cited

U.S. PATENT DOCUMENTS

| | | | |
|---|---|---|---|
| 5,710,420 A * | 1/1998 | Martin et al. ............... 235/487 |
| 5,983,065 A | 11/1999 | Folkins et al. |
| 6,072,871 A | 6/2000 | Ur |
| 6,312,911 B1 | 11/2001 | Bancroft et al. |
| 6,313,920 B1 * | 11/2001 | Dresevic et al. ............ 358/1.11 |
| 6,351,815 B1 | 2/2002 | Adams |
| 6,362,893 B1 | 3/2002 | Francis et al. |
| 6,378,070 B1 | 4/2002 | Chan et al. |
| 6,389,151 B1 * | 5/2002 | Carr et al. ................... 382/100 |
| 6,431,699 B2 | 8/2002 | Shihoh et al. ................. 347/86 |
| 6,493,014 B2 | 12/2002 | Aroneo |
| 6,694,884 B2 | 2/2004 | Klinefelter et al. .......... 101/484 |
| 6,765,688 B1 * | 7/2004 | Claiborne ................... 358/1.18 |
| 6,839,848 B1 * | 1/2005 | Kirikoshi et al. ............... 726/2 |
| 7,027,179 B2 * | 4/2006 | Mori .......................... 358/1.18 |
| 7,031,471 B2 * | 4/2006 | Stefik et al. ................. 380/231 |
| 7,136,502 B2 * | 11/2006 | Rhoads et al. ............... 382/100 |
| 7,231,524 B2 | 6/2007 | Burns .......................... 713/176 |

(Continued)

FOREIGN PATENT DOCUMENTS

GB 2358115 7/2001

OTHER PUBLICATIONS

International Search Report & Written Opinion of the International Searching Authority, Dec. 15, 2006, 10 pages.

*Primary Examiner* — James A Thompson
*Assistant Examiner* — Satwant Singh
(74) *Attorney, Agent, or Firm* — St. Onge Steward Johnston & Reens LLC

(57) ABSTRACT

A document security system for securely printing documents that are uniquely marked on each page of ordinary or specialized paper with a security mark such that copying and or alteration is prevented, the security mark comprising information relating to the document and further being unique to each page having specific information relating to each page of the document.

27 Claims, 5 Drawing Sheets

U.S. PATENT DOCUMENTS

| | | | |
|---|---|---|---|
| 7,259,878 B2 * | 8/2007 | Ishida et al. | 358/1.14 |
| 7,295,988 B1 * | 11/2007 | Reeves | 705/3 |
| 7,395,431 B2 * | 7/2008 | Fukushima et al. | 713/176 |
| 2002/0041372 A1 | 4/2002 | Gardner et al. | |
| 2002/0051167 A1 | 5/2002 | Francis et al. | |
| 2002/0105572 A1 | 8/2002 | Testardi et al. | |
| 2002/0105666 A1 | 8/2002 | Sesek | |
| 2002/0120855 A1 | 8/2002 | Wiley et al. | |
| 2003/0011810 A1 | 1/2003 | Strobel et al. | |
| 2003/0021442 A1 * | 1/2003 | Suzaki | 382/100 |
| 2003/0028494 A1 * | 2/2003 | King et al. | 705/71 |
| 2003/0083996 A1 | 5/2003 | Fischer | |
| 2003/0099353 A1 | 5/2003 | Goh et al. | 380/51 |
| 2003/0177095 A1 * | 9/2003 | Zorab et al. | 705/50 |
| 2004/0026502 A1 * | 2/2004 | Tame | 235/382 |

* cited by examiner

SECURE DOCUMENT PRINTING

PRIORITY DOCUMENT

This application claims priority from U.S. Provisional Patent Application Ser. No. 60/401,312 filed on Aug. 6, 2002.

FIELD OF THE INVENTION

This invention relates to verification of the authenticity of a hard copy of a document. It develops from the integration of a digitally secure document with a secure desk top printer that will mark the document as it is printed on ordinary paper in such a way that it may be proven that it is an authentic document and not a copied or modified document.

BACKGROUND OF THE INVENTION

Computers increasingly originate or process most documents in use today. As such, the need for increasing security of computer files and then the hard copies (printed document) of computer files is critical. To that end, computer files have been developed to the stage where certain security features can keep the information relatively secure (restricted access and confirmation of authors) from origination, to storage, and to delivery in digital format. For instance, input controls and certification techniques, such as fingerprint entry pads to a personal computer, may help to identify a user/originator at the place of origination for the digital document. This technique is sufficient if the file is maintained in digital format.

However, many documents are subsequently printed for distribution or even for record keeping, and the above-listed certification technique will not prevent copying and/or alteration of printed hard copies of the document. It is important to be able to identify if any page of a document has been altered or changed in any way.

A further challenge to the security of printed documents is that, with the widespread advent of computer networks and the Internet, documents are more and more likely to be printed in a remote location from the originator. As a result, various security and encryption systems have been utilized to securely print documents.

Various patents and published applications have sought to deal with the issue of providing a secure printer from a remote computer terminal and for providing a security marking on the printed document.

For instance, Published U.S. Patent Application No. US 2003/0011810 to Strobel et al. ("the 0011810 application") discloses encrypting a document sent to a printer and sending a key to a mobile device in the possession of a user. The 0011810 application further teaches that once the mobile device is brought into close proximity of the printer, a connection between the two is established with the mobile device providing the key to the printer which, in turn, decrypts and prints the document. However, the 0011810 application fails to teach or disclose a system to watermark the paper and to ensure that the a printed document is authentic and has not been copied or altered.

Alternatively, U.S. Pat. No. 6,351,815 B1 to Adams ("the '815 patent") discloses a system for providing media-independent security for a printed document. The '815 patent discloses use of a background object, an image object or a watermark object. The '815 patent further discloses that a pattern may be output with copies of the document and that data may be inserted in the pattern. The data contained in the pattern may include information relating to the creation and control of the entire document. However, the '815 patent fails to teach the insertion of data on the printed document that is unique to each page of the document to be printed. Furthermore, if the printed page is copied, the watermark may also be copied.

Published U.S. Patent Application No. US 2002/0041372 to Gardner et al. ("the 0041372 application") discloses use of a latent security marking on a document to determine of the document is an original, the marking comprising a covert phosphor formulation that renders the mark visible only under certain lighting. Again, however, the 0041372 application fails to teach the insertion of data on the printed document that is unique to each page of the document to be printed.

Published U.S. Patent Application No. US 2002/0105572 to Testardi et al. ("the 0105572 application") discloses the use of a glossy topcoat that may be applied to a document to provide a security mark on the printed document. However, the 0105572 application also fails to teach the insertion of data on the printed document that is unique to each page of the document to be printed.

Finally, Published Patent Application No. GB 2358115 to Braudaway et al. ("the 2358115 application") discloses sending an encrypted document to a printer that may be certified by a user as authentic, the certification appearing on the printed copy. The 2358115 application also teaches the use of special paper that is very difficult to copy or reproduce such that unauthorized copies of the document will be readily discernable. However, like the above-listed references, the 2358115 application also fails to teach the insertion of data on the printed document that is unique to each page of the document to be printed.

Therefore, what is desired is a document security system that will watermark each page as it prints so as to indicate whether unauthorized printing, alteration or duplication of a document has occurred. The watermark being provided such that it cannot be accurately copied or counterfeited, and containing machine readable encoded data unique to each page.

It is also desired to provide a document security system that will provide a security marking on a printed document, the security marking being unique to each page of the document.

It is further desired to provide a document security system that will provide a secure printing environment, such that unauthorized copies of documents cannot be printed.

SUMMARY OF THE INVENTION

These and other objects are obtained by a document security system where a printer is addressed and linked to a document source and is provided such that a security encryption/certification is carried through to print the file. The printed pages are marked with a security marking ("a watermark") that uniquely identifies that particular authentic page of the printed document.

In implementing this document security system, the printer might, for instance, be arranged to only print if the file is coded as from a selected source. Alternatively, the printer might be set up to print only if the file access history meets specified criteria, for instance, "never before opened." Further, the printer may be programmed to only print the document once.

In addition to these printer features, the printer may be accessible only by the approved party or by approved personnel. To that end, a security entry system (i.e. fingerprint keypad) such as is utilized by the file originator to design or type the document, may also be applied to the printer. If the fingerprint entry system identifies and logs a file originator, the document security system may be programmed to only print the document upon a fingerprint match of the file originator.

Further, the printer should be able to distinguish the certification details of the digital file and be activated by an acceptable code or signal.

The document security system should also provide a security mark on ordinary or specialized paper, which can be forensically validated as true and original. The mark may be measurably, provably unique to that document and even to each particular page of the printed document. The security mark may, for instance, be placed on the page as the document is printed and may be covert, overt or a combination. The security mark will effectively water mark that paper as it is printed to provide the same anti-counterfeiting advantage of watermarks and other features usually marked at a production factory. However, the security mark may be unique to the particular file and to the particular page of paper, having a unique (unique to that individual page) number or code. In addition, the paper utilized by the printer may also have features built-in before the printing so to avoid tampering later, such as a watermark, shading or other design.

Accordingly, in one advantageous embodiment of the present invention a document security system for printing secured documents is provided comprising a digital file accessible by a receiver via a terminal and a printer connected to the terminal. The document security system further comprises security data specific to each page of the digital file and a mark printed by the printer on each page of the printed digital file, the mark containing data specific to each page of the printed digital file.

In another advantageous embodiment of the present invention, a document security system for printing secured documents is provided comprising a digital file accessible by a sender via a terminal, the digital file comprising at least two pages to be printed and a printer connected to the terminal via a network. The document security system further comprises security data specific to each page of the digital file, and at least two marks printed by the printer on the at least two pages of the printed digital file, the marks containing data specific to each of the at least two pages of the printed digital file and the at least two marks being different from each other.

In still another advantageous embodiment of the present invention a method for printing secured documents is provided comprising the steps of collecting verification data from a sender relating to a digital file, verifying access to the digital file based upon the collected verification data, and accessing the digital file. The method further comprises the steps of inputting a print command, generating security data related to the verification data, the security data being specific to each page of the digital file to be printed, and encrypting the digital file. The method still further comprises the steps of sending the encrypted digital file to a printer, and printing the digital file with a mark on each page of the document, the mark for each page containing data specific to each page of the printed document.

In yet another advantageous embodiment of the present invention a method for printing secured documents is provided comprising the steps of accessing the digital file, and generating security data related to the digital file, the security data being specific to each page of the digital file to be printed. The method further comprises the steps of sending the digital file to a printer, and printing the digital file and a mark on each page of the digital file, the mark containing data specific to each page of the printed digital file.

In still another advantageous embodiment of the present invention a document security system for printing secured documents is provided comprising a digital file accessible by a receiver via a computer terminal and security data specific to the digital file and to each page of the digital file. The document security system further comprises a printer connected to the computer terminal, and a mark printed by the printer on each page of the printed digital file, the mark containing data specific to each page of the printed digital file.

In yet another advantageous embodiment of the present invention a document security system for printing secured documents is provided comprising a digital file accessible by a receiver via a computer, and a printer connected to the computer. The document security system further comprises security data specific to the digital file, and ink usable by the printer, the ink having coded DNA information that contains the security data specific to the digital file. The document security system still further comprises a mark printed by the printer with the ink on the printed digital file, the mark containing data specific the printed digital file.

In still another advantageous embodiment of the present invention a document security system for printing secured documents is provided comprising a digital file accessible by a receiver via a computer, and a printer connected to the computer. The document security system further comprises security data specific to the digital file, and an Optical Variable Device printed by the printer on each page of the printed digital file, the Optical Variable Device containing data specific the printed digital file.

In yet another advantageous embodiment of the present invention a document security system for printing secured documents is provided comprising a digital file accessible by a sender via a terminal, and a printer connected to the terminal via a network connection. The document security system further comprises security data specific to each page of the digital file, and a mark printed by the printer on each page of the printed digital file, the mark containing data specific to each page of the printed digital file.

The invention and its particular features and advantages will become more apparent from the following detailed description considered with reference to the accompanying drawings.

DETAILED DESCRIPTION OF THE DRAWINGS

Figure 1A:
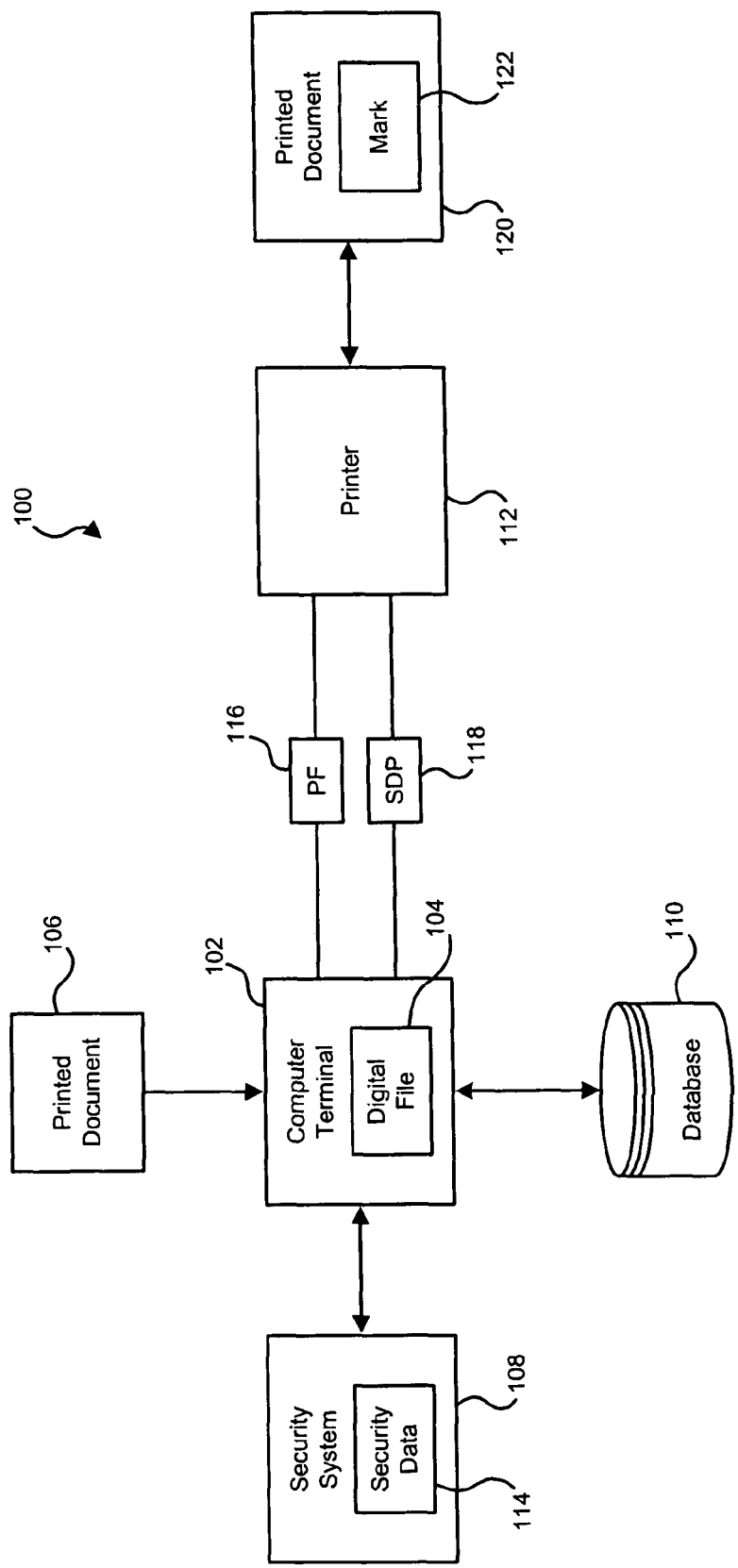
FIG. 1A is a block diagram of one advantageous embodiment of the present invention.

One advantageous embodiment of the present invention is illustrated in FIG. 1A. The document security system 100 for printing secure documents is shown as a block diagram in FIG. 1A. The securely printed documents may comprise any documents containing highly sensitive information, or documents in which verification of authenticity is critical, such as for instance, negotiable instruments.

FIG. 1A illustrates a computer terminal 102 provided as an interface for allowing a user to input access requests for data and/or information. Computer terminal 102 may comprise any type of digital computer, such as, for instance, a personal computer or a terminal for logging into a mainframe. Also depicted in FIG. 1A is digital file 104. Digital file 104 may comprise any type of digital file accessible by computer terminal 102 and may contain any type of data normally stored in digital format, such as, for instance, word processing documents, digital pictures or illustrations, audio or video files, text, links to web addresses, programs or any other data normally stored in digital format.

In order to access digital file 104, verification data 106 is first gathered. Verification data 106 may comprise, for instance, information and/or data related to the user requesting access to digital file 104, it may also comprise information relating specifically to digital file 104, or combinations of the two.

A security system 108 is provided to limit access to proprietary information that may, for instance, be contained in digital file 104. Security system 108 may analyze gathered verification data 106 to determine if access is permitted to digital file 104. Access to digital file 104 may be permitted or denied based upon a number of variables. For instance, access may be permitted or denied based upon: the origin of the request (i.e., security system 108 may only allow access from certain computer terminals); the number of times digital file 104 has been accessed (i.e., security system 108 may only allow access a specified number of times); the identity of the user requesting access to digital file 104; or combinations of the above (i.e., certain individuals may only be allowed access a specified number of times from specific computer terminals). It is contemplated, however, that numerous variations of access restrictions may be utilized to maintain desired security.

Once security system 108 has analyzed verification data 106 and determined that the user may access digital file 104, computer terminal accesses digital file 104 from database 110. Database 110 may comprise any form of digital storage appropriate to store digital information and/or data. For instance, database 110 may comprise a magnetic hard drive, a magnetic floppy disk, an optical drive, an optical disk (CD), a tape drive, RAM, ROM, EPROM, EEPROM or any other digital storage medium whether volatile or non-volatile. Furthermore, although database 110 is illustrated as being local to computer terminal 102, it is contemplated that database 110 may be located remotely from computer terminal 110 and accessible over, for instance, a secure network, an Internet-work or the Internet.

Once computer terminal 102 has accessed digital file 104, the user may then enter a request to print digital file 104. Computer terminal 102 will then generate a print file 116 to be sent to printer 112. Security system 108 will monitor for a request to print digital file 104 and upon receipt of such request, will generate security data 114 specifically relating to digital file 104 prior to print file 116 being sent to printer 112.

Security data 114 comprises data that is related to digital file 104, for instance, including, but not limited to the size of the file, the location of the file, the type of file, the author of the file, how many times the file has been accessed and/or moved, the identities of all users who have accessed and/or altered the file, the number of times a print request has been made for the file, the number of times a request for access to the file has been made and by whom or any other information that one would desire to know about in connection to digital file 104.

Once print file 116 has been generated, security system 108 may analyze the print format and total number of pages to be printed. Security data 114 may reflect this information, which will be specific to and printed on each page of digital file 104 printed.

The print file 116 of digital file 104 is then sent to printer 112. Also sent with print file 116 is security data package 118 that contains security data 114. While print file 116 is illustrated as separate from security data package 118, these are shown in this manner to illustrate that different information is being sent to network printer 112, the print file information relating to the data contained in digital file 104 while the security data information relating to the security features to be activated by the printer and the security mark 122 to be applied to the printed document 120. Only one actual file may be sent to printer 112 from computer terminal 102, that one file containing the print file 116 information and the security data package 118 information. Alternatively, it is contemplated that print file 116 and security data package 118 could be sent separately from each other however, this is not required.

Once printer 112 receives print file 116, it will monitor for receipt of security data pack 118. Security data package 118 will contain security data 114 for generating a mark 122 that specifically relates to each page of digital file 104 to be printed. Once printer 112 has received security data package 118, printer 112 proceeds to generate printed document 120. Printed document 120 will have mark 122 printed thereon. Printer 112 will be able to print mark 122 on printed document 120 in such a manner that mark 122 is measurably unique for each page of printed document 120.

Mark 122 is a unique mark that contains data related to the specific page of printed document 120 on which it is located comprising, for instance, a number or code that is unique to that particular printed page of digital file 104. Mark 122 may be provided in such a manner that it is overt, covert or a combination of the two. In one advantageous embodiment, mark 122 is provided as, for instance, a watermark that may be printed on ordinary paper, or alternatively, on specialized paper. One major advantage of utilizing watermarks is that they are very difficult to copy providing a large anti-counterfeiting advantage. In another advantageous embodiment, mark 122 is provided as verifiable information and/or data located on the page. In still another advantageous embodiment, a combination of these methods may be used with some security data clearly discernable to the eye printed on the page, while simultaneously having covert security data printed on the same page.

Encoded information that may not be counterfeited is disclosed in U.S. Pat. No. 6,312,911 to Bancroft et al. entitled DNA-based steganography, which is incorporated herein by reference. This patent teaches how to make an ink for a watermark that contains secret DNA material imbedded into the ink to thereby achieve the highest possible level of security.

Therefore, mark 122 may comprise a DNA-based ink that is printed on each page of document 120, mark 122 having DNA information contained in the ink that is unique to each page of printed document 120, which may be printed on either ordinary paper or specialized paper.

Alternatively, mark 122 may comprise an Optical Variable Device (OVD), such as a holographic image, printed on each page of document 120. U.S. Pat. No. 6,493,014 to Aroneo entitled Optical Security Device Printing System discloses various means for printing a hologram by a printer and is incorporated herein by reference.

The OVD may further comprise information that is unique to document 120 and the individual OVD marks printed on each page of document 120 may contain information unique to that page of the document. The OVD mark will not be able to be authentically copied and may contain overt information, covert information or combinations thereof. It can contain information encoded with data of any type, including for instance, page number, etc. Such a mark is a point of use, page-by-page watermark placed on ordinary or specialized paper at the time of printing.

As a further anti-counterfeiting measure, printer 112 may be supplied with and generate printed document 120 on a specialized paper that is difficult to counterfeit. For instance, the medium may comprise Thermal Transfer holographic foil or some other similar medium. Alternatively, the medium may comprise a background pattern; include variable shading; comprise color or variable colors; or any other medium that proves difficult to reproduce and/or copy.

Figure 1B:
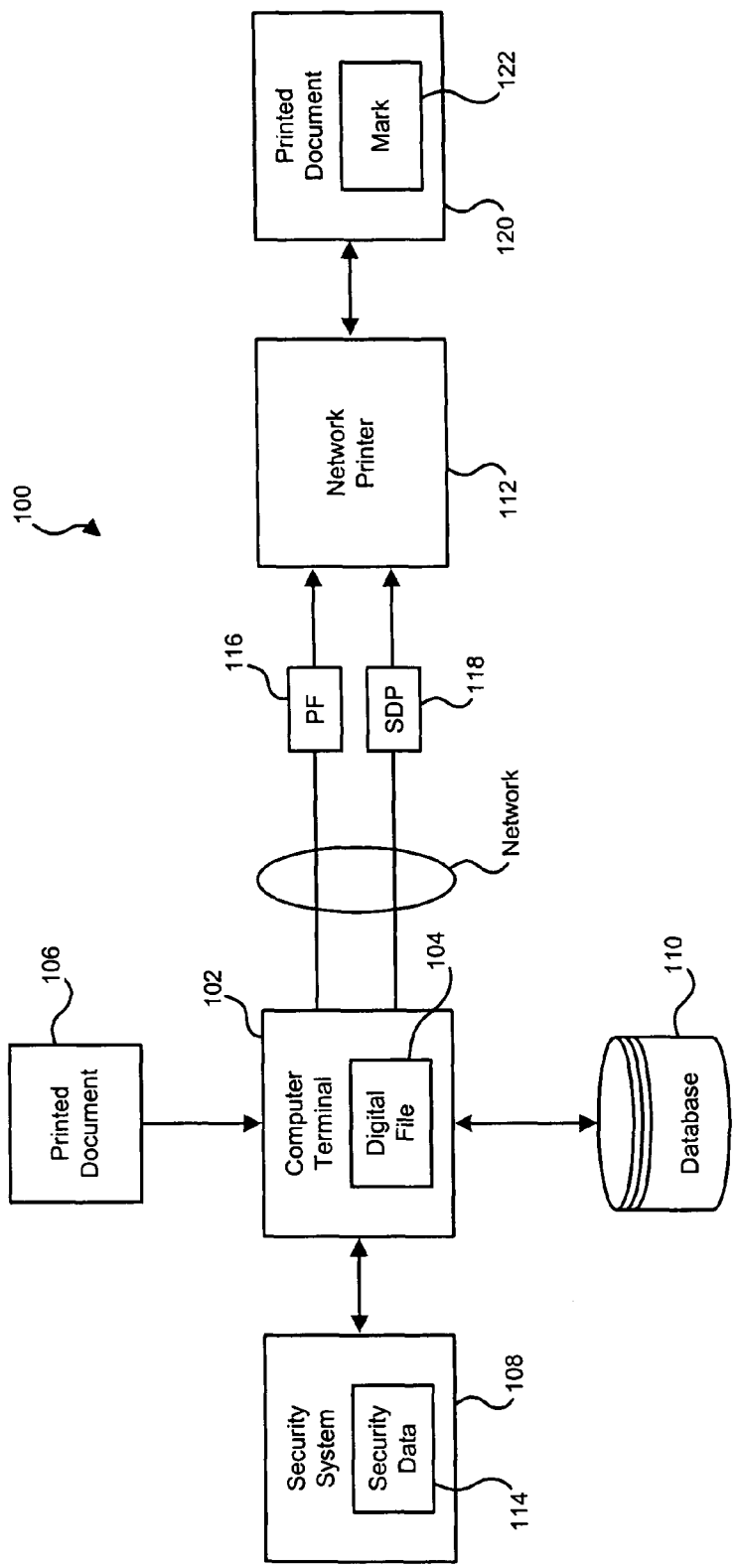
FIG. 1B is a block diagram of another advantageous embodiment of the present invention.

FIG. 1B is a block diagram of another advantageous embodiment of the present invention. FIG. 1B has common features with FIG. 1A, which will not be re-described here, except that computer terminal 102 is connected to printer 112 via a network connection. As mentioned earlier in connection with database 110, the network connection may comprise, for instance, a secure network, an Internetwork or the Internet. It is contemplated that computer terminal 102 may comprise for instance, a portable computer that may be connected to a network or the Internet wherever a suitable connection is available.

Figure 2:
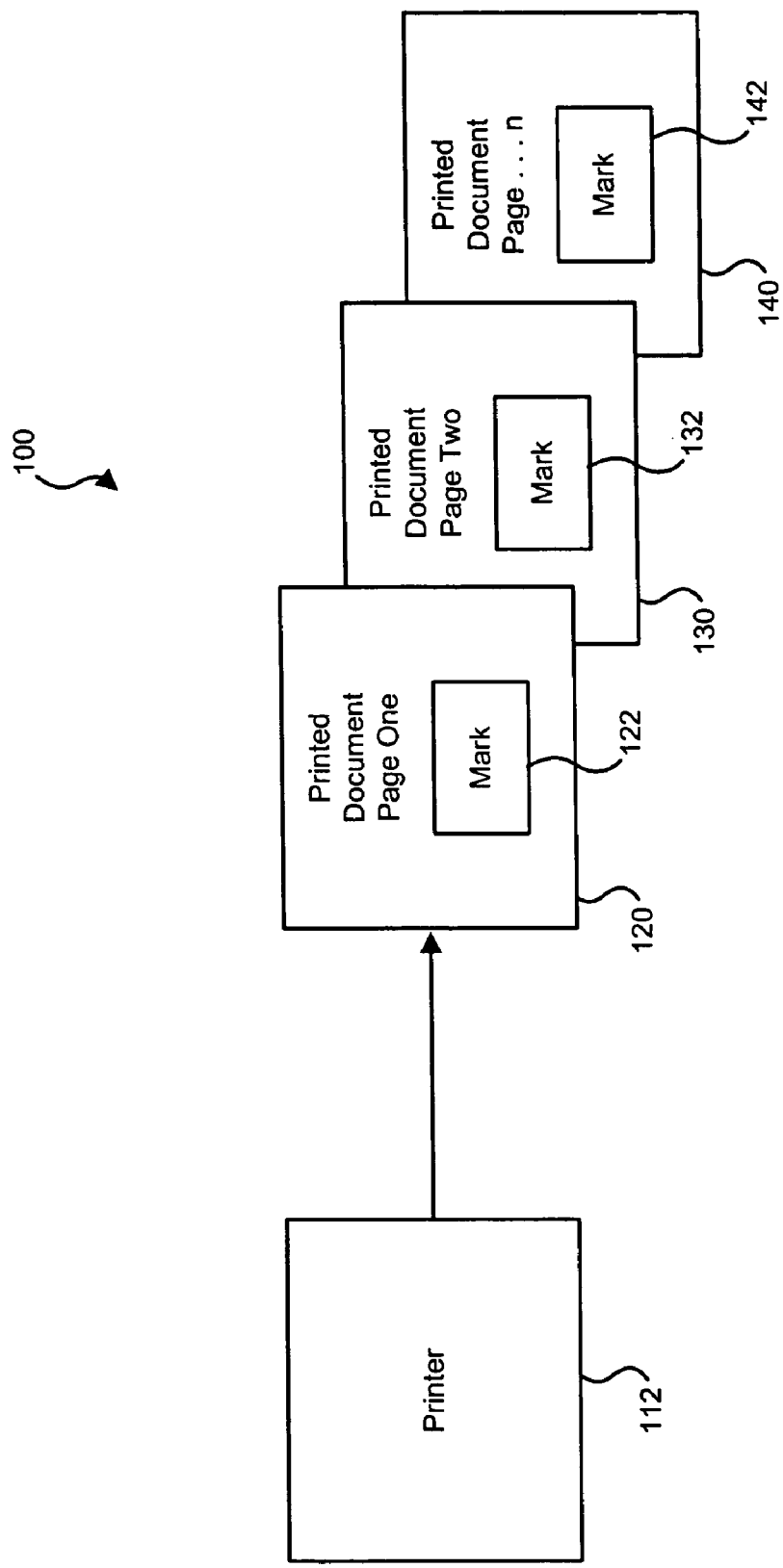
FIG. 2 is a block diagram of still another advantageous embodiment of the present invention.

FIG. 2 is a block diagram of another advantageous embodiment of document security system 100 according to FIG. 1. Network printer 112 is illustrated in FIG. 2 along with printed document 120 having security mark 122 as previously discussed. Also shown is printed document 130 having security mark 132 and printed document 140 having security mark 142. Printed documents (120, 130, 140 . . . ) comprise individual printed pages of digital file 104. Each individual page receives a security mark (122, 132, 142 . . . ) that specifically and uniquely identifies that particular page. The security mark, as discussed previously, may comprise, for instance, a number or code that uniquely identifies that particular page of the printed file.

While security mark (122, 132, 142 . . . ) is illustrated at the center of printed document (120, 130, 140 . . . ) this is not necessary. For instance, security mark (122, 132, 142 . . . ) may be located at the top, bottom or side of the page. Additionally, security mark (122, 132, 142 . . . ) may comprise a watermark that is located anywhere across printed document (120, 130, 140 . . . ) or may comprise a combination of overt and covert markings. While the marking method may vary depending upon the application and security level desired, it is important that security mark (122, 132, 142 . . . ) be measurably unique for each page, whether printed on ordinary or specialized paper, of printed document (120, 130, 140 . . . ). Therefore, a unique security mark (122, 132, 142 . . . ) will be generated for each and every page of the printed document (120, 130, 140 . . . ).

Figure 3:
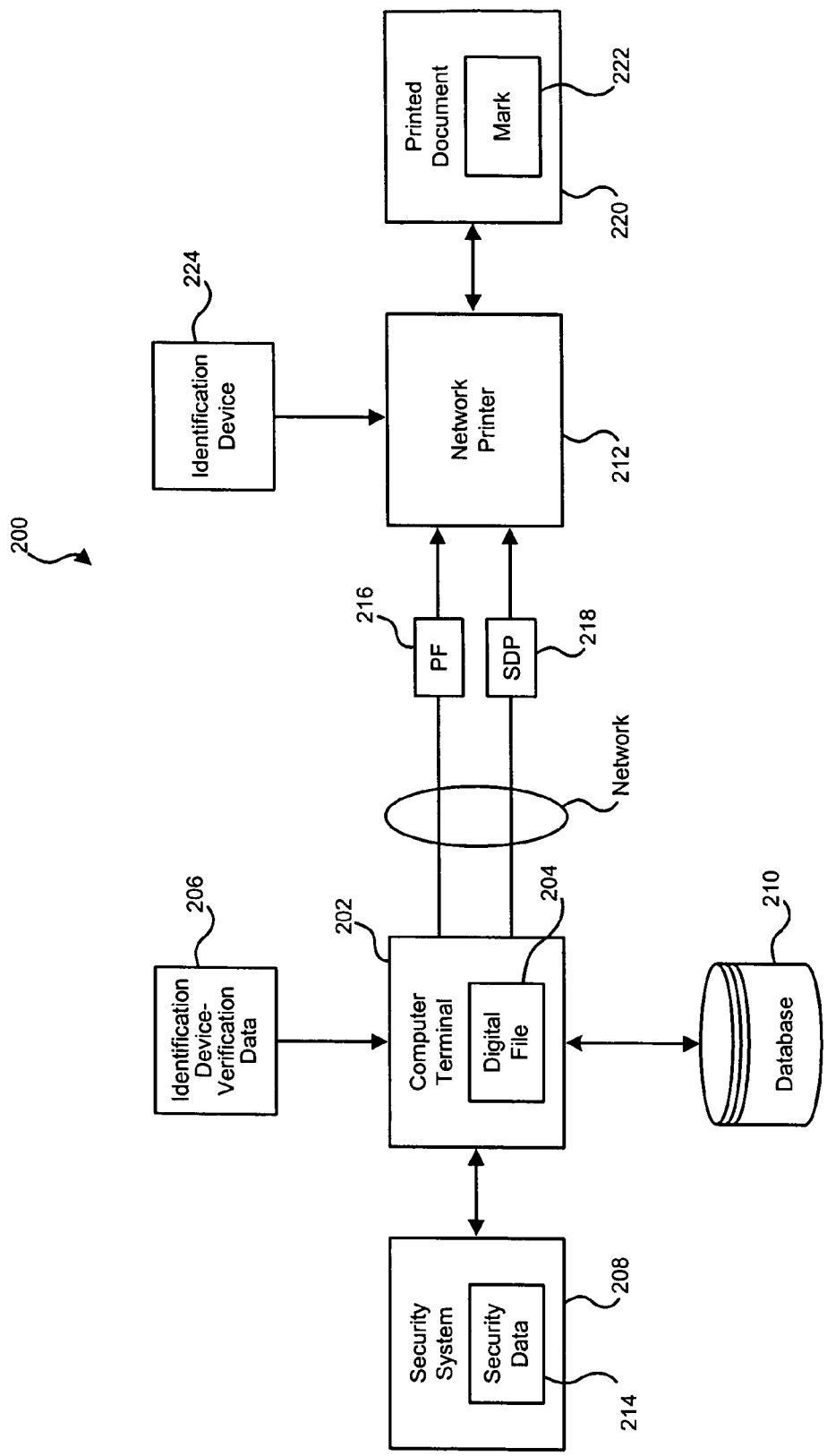
FIG. 3 is a block diagram of yet another advantageous embodiment of the present invention.

FIG. 3 is a block diagram of still another advantageous embodiment of the present invention illustrating document security system 200 for printing secure documents. As document security system 200 is similar in some respects to document security system 100 discussed in connection with FIG. 1, only those features that differ will be discussed in detail.

Computer terminal 202, digital file 204 and database 210 are similar to those discussed in connection with FIG. 1. Also provided with computer terminal 202 is identification device 206. Identification device 206 may comprise any device that may reliably identify the user requesting access to digital file 204. For instance, identification device 206 may comprise any type of device for measuring biologic specific information, such as a fingerprint or DNA. Alternatively, identification device 206 may comprise a cardkey reader, an alphanumeric keypad or any other device that may read an identification code. Once identification device 206 has received identification information and/or data from the user, security system 208 then determines if a request for access to digital file 204 may proceed.

After the user has accessed digital file 204, as discussed previously in connection with FIG. 1, the user may request to print the file. Security system 208 then generates security data 214 as described in connection with FIG. 1. However, in this embodiment, security system 208 also encrypts print file 216 prior to sending print file 216 to network printer 212. The security system 208 may utilize any encryption method or scheme desired to effectively render print file 216 inaccessible to unauthorized individuals. Also sent to network printer 212 is security data package 218, which contains security data 214 as discussed in connection with FIG. 1.

While computer terminal 202 is shown, in this embodiment, connected to the printer 212 via a network, it is contemplated that printer 212 may be a local printer as discussed in connection with FIG. 1A.

Also provided at network printer 212, is identification device 224. Identification device may comprise any appropriate device for identification of a user as discussed in connection with identification device 206. It should be noted, however, that identification device 206 and identification device 224 may be the same type of device or may be different. For instance, identification device 206 may comprise a fingerprint reader, while identification device 224 may comprise a keypad or cardkey access device.

In any event, network printer 212 must distinguish the certification details of print file 216 and security data package 218 with the identification information and/or data received to determine which features to activate. For instance, depending upon the identification information and/or data received, network printer 212 may generate printed document 220, a portion thereof or perform some other action. If access is not permitted by the individual attempting to print our print file 216, network printer may lock down, send a notification, not respond to the input or any combination thereof.

Alternatively, network printer 212 may, depending upon received security data package 218, be configured to print from only a selected source-only if digital file 204 has not first been opened or only print digital file 204 one time. It is contemplated that many differing security logic schemes may be effectively utilized to secure the information contained in digital file 204, which will vary according to the sensitivity of that information.

Mark 222 is generated and printed on printed document 220 in a manner similar to that described in connection with FIG. 1. As previously discussed, mark 222 is a unique mark that contains information and/or data related to the specific page of printed document 220 on which it is printed, which may comprise ordinary or specialized paper.

Figure 4:
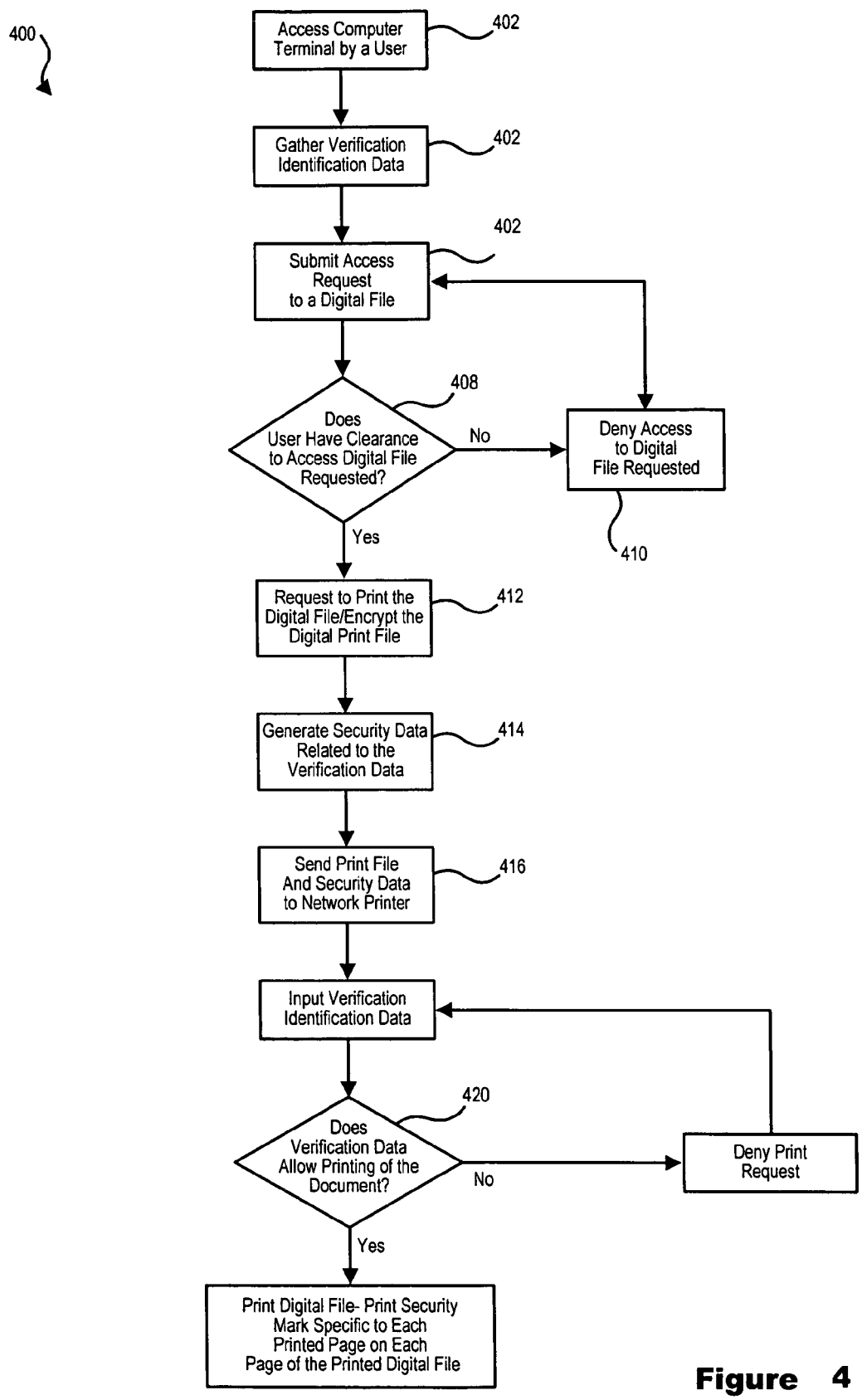
FIG. 4 is a flow diagram of still another advantageous embodiment of the present invention.

FIG. 4 is a flow diagram illustrating a sequence of operation 400 for the advantageous embodiments illustrated in FIGS. 1 and 3. As an initial step, a user accesses a computer terminal 402. At this point, verification/identification data is gathered 404 relating to the user. The user then submits an access request to access a digital file 406. A security system then determines if the user has clearance to access the digital file request 408. The security system may utilize various types of information to make this determination. For instance, the security system may make the determination based upon the identity and clearance of the user, the location from which the request is being sent, whether or not the requested digital file has been previously accessed and/or altered, whether the requested digital file has been previously printed or not or whether the requested digital file has been the target of a previous request from the identified user or someone else. It is contemplated that any number of security criteria may be utilized to limit access to proprietary information contained in digital file 104 and the list above is provided merely as an example of some of the various criteria that may be utilized.

Alternatively, in the case of stand alone printers, clearance to utilize the local printer may give full authority to print the file as the document will print out at the local printer and not some remote location.

If the security system determines to deny access to the digital file requested 410, the security system may perform a number of actions. For instance, as illustrated in FIG. 4, the security system may simply return the user back to the step of submitting a request to access a digital file 406. However, it is contemplated that the security system may, for instance, determine to lock the user out of the computer terminal. The lock out may be a complete lock out of the system or may simply deny the user access to certain functions. Alternatively, the security system may send a notification message of an unauthorized attempt to access a digital file. Again, it is contemplated that a number of varying responses may be taken by the security system depending upon what is desired.

If, however, the security system determines that the user does have clearance to access the requested digital file, access is granted. At this point, the user may enter a request to print the digital file 412. In the embodiment discussed in connection with FIG. 1, a print file would then be generated to be sent to the printer in order to print the digital file. In the embodiment discussed in connection with FIG. 3, a print file would also be generated, but then the security system would encrypt the file in a secure format.

Simultaneously, the security system is also generating security data relating to the verification data 414, which also relates to the digital file to be printed. The security data generated may comprise any information and/or data as previously discussed in connection with FIGS. 1 and 3.

Next, the system sends the print file/encrypted print file and the security data to a network printer 416 to be printed. The print file and the security data may be sent to network printer via a network connection between the computer terminal and the network printer as discussed in connection with FIGS. 1 and 3. At this point, the network printer will wait until the input of verification/identification data 418 and then determine if the verification data allows printing of the document 420. This may comprise, for instance, identifying the user and determining if that user has clearance to print the document, certifying that the appropriate code/signal has been received prior to printing the document or determining what printer features have been activated by the security data and if the appropriate actions have been taken. These certification techniques may include any previously-discussed techniques, such as biologic specific information (fingerprint), cardkey access, keypad access or combinations thereof. Again, it is contemplated that any number of security functions may be applied at this step to determine if the user seeking to print the file has clearance to do so.

If the security system determines that the verification data does not allow printing of the document, the security system denies the print request 422. At this point, the system may simply return to waiting for inputting of verification/identification data 418. Alternatively, the system may take any number of specified actions as previously discussed when a failed access occurs.

If, however, the security system determines that correct verification data has been received, the network printer proceeds to print the file. A security mark is printed on each page of the printed document as described in connection with FIGS. 1-3. The security mark will be unique to the document being printed and be unique to the specific page on which it is printed. The security mark will also be measurably unique, such that verification of the mark as being true and original may occur.

In addition, the printed document may be printed on any kind of print medium that is difficult to counterfeit as previously described herein.

Although the invention has been described with reference to a particular arrangement of parts, features and the like, these are not intended to exhaust all possible arrangements or features and, indeed, many other modifications and variations will be ascertainable to those of skill in the art.

What is claimed is:

1. A document security system for printing secured documents comprising:
    a digital file accessible by a receiver via a terminal;
    a printer connected to the terminal;
    security data specific to each page of said digital file; and
    a printed file printed by said printer corresponding to said digital file;
    a mark printed by said printer on each page of the printed file, said mark containing data unique to each page of the printed file;
    wherein said mark printed on each page of the printed file comprises covert data;
    wherein reproduction of the printed file as an authenticable printed file is prevented by means of the mark containing data unique to each page of the printed file.

2. The document security system for printing secured documents according to claim 1 wherein said printer is connected to said terminal via a network connection.

3. The document security system for printing secured documents according to claim 1 further comprising an identification device for identifying the sender.

4. The document security system for printing secured documents according to claim 3 wherein a second identification device is provided at the printer wherein the printer will not print said digital document unless identification data gathered by the second identification device matches stored identification data of users that are allowed access to said digital document.

5. The document security system for printing secured documents according to claim 3 wherein said identification device comprises a fingerprint keypad.

6. The document security system for printing secured documents according to claim 1 wherein the security system encrypts said digital file prior to said digital file being sent to the printer.

7. The document security system for printing secured documents according to claim 1 wherein said mark is a watermark.

8. The document security system for printing secured documents according to claim 1 wherein said mark comprises DNA information coded in ink utilized to print said mark.

9. The document security system for printing secured documents according to claim 1 wherein said mark is printed on a medium, said medium selected from the group consisting of: plain paper, paper having a distinct pattern located thereon, or thermal transfer holographic foil.

10. The document security system for printing secured documents according to claim 9 wherein said verification data includes identification of the sender.

11. The document security system for printing secured documents according to claim 9 wherein the security system selectively grants the user access to said digital file based upon the collected verification data.

12. The document security system for printing secured documents according to claim 1 wherein said printer uses ink to print said digital file, said ink selected from the group consisting of: DNA ink or fluorescent ink.

13. The document security system for printing secured documents according to claim 1 further comprising verification data gathered by the security system for verifying whether the sender has clearance access said digital file.

14. A document security system for printing secured documents comprising:
a digital file accessible by a sender via a terminal, said digital file comprising at least two pages to be printed;
a printer connected to the terminal via a network;
a printed file printed by said printer corresponding to said digital file;
security data specific to each page of the printed file; and
at least two marks printed by said printer on the at least two pages of the printed file, said marks containing data unique to each of the at least two pages of the printed file;
wherein said at least two marks comprise covert data;
wherein reproduction of the printed file as an authenticable printed file is prevented by means of the mark containing data unique to each page of the printed file.

15. The document security system for printing secured documents according to claim 14 further comprising verification data gathered by the security system for verifying whether the sender has clearance access said digital file.

16. The document security system for printing secured documents according to claim 15 wherein said verification data includes identification of the sender.

17. The document security system for printing secured documents according to claim 14 wherein the security system encrypts said digital file prior to said digital file being sent to said printer.

18. The document security system for printing secured documents according to claim 14 wherein said mark is a watermark.

19. A method for printing secured documents comprising the steps of:
collecting verification data from a sender relating to a digital file;
verifying access to the digital file based upon the collected verification data;
accessing the digital file;
inputting a print command;
generating security data related to the verification data, the security data being specific to each page of the digital file to be printed;
encrypting the digital file;
sending the encrypted digital file to a printer; and
printing the digital file with a mark on each page of the document, the mark for each page containing data unique to each page of the printed document;
wherein said mark printed on each page of the printed file comprises covert data;
wherein reproduction of the printed document as an authenticable printed file is prevented by means of the mark containing data unique to each page of the printed document.

20. The method for printing secured documents according to claim 19 further comprising the steps of selectively granting the sender access to the digital file based upon the collected verification data.

21. The method for printing secured documents according to claim 19 wherein the verification data includes identification of the sender.

22. The method for printing secured documents according to claim 19 wherein the mark comprises a watermark.

23. A method for printing secured documents comprising the steps of:
accessing the digital file;
generating security data related to the digital file, the security data being specific to each page of the digital file to be printed;
sending the digital file to a printer;
printing the digital file and a mark on each page of the digital file, the mark containing data unique to each page of the printed file;
wherein said mark printed on each page of the printed file comprises covert data;
wherein reproduction of the printed file as an authenticable printed file is prevented by means of the mark containing data unique to each page of the printed file.

24. A document security system for printing secured documents comprising:
a digital file accessible by a receiver via a computer terminal;
security data specific to said digital file and to each page of said digital file;
a printer connected to the computer terminal; and
a mark printed by said printer on each page of the printed file, said mark containing data unique to each page of the printed file;
wherein said mark printed on each page of the printed file comprises covert data;
wherein reproduction of the printed file as an authenticable printed file is prevented by means of the mark containing data unique to each page of the printed file.

25. A document security system for printing secured documents comprising:
a digital file accessible by a receiver via a computer;
a printer connected to the computer;
security data specific to said digital file;
ink usable by said printer, said ink having coded DNA information that contains said security data specific to said digital file; and
a mark printed by said printer with said ink on the printed file, said mark containing data specific the printed file;
wherein said security data further comprises data unique to each page of said file and said mark further contains data unique to each page of said file; and
wherein said mark printed on each page of the printed file comprises covert data;
wherein reproduction of the printed file as an authenticable printed file is prevented by means of the mark containing data unique to each page of the printed file.

26. A document security system for printing secured documents comprising:
a digital file accessible by a receiver via a computer;
a printer connected to the computer;
security data specific to said digital file; and
an Optical Variable Device printed by said printer on each page of the printed file, said Optical Variable Device containing data specific the printed file;
wherein said security data further comprises data unique to each page of said digital file and said Optical Variable Device further contains data unique to each page of said digital file; and
wherein reproduction of the printed file as an authenticable printed file is prevented by means of the mark containing data unique to each page of the printed file.

27. A document security system for printing secured documents comprising:

a digital file accessible by a sender via a terminal;
a printer connected to the terminal via a network connection;
security data specific to each page of said digital file; and
a mark printed by said printer on each page of the printed file, said mark containing data unique to each page of the printed file;

wherein said mark printed on each page of the printed file comprises covert data;

wherein reproduction of the printed file as an authenticable printed file is prevented by means of the mark containing data unique to each page of the printed file.

* * * * *